United States Patent
Song et al.

(10) Patent No.: US 12,308,417 B2
(45) Date of Patent: May 20, 2025

(54) ELECTRODE FOR SECONDARY BATTERY AND LITHIUM SECONDARY BATTERY COMPRISING THE SAME

(71) Applicant: LG ENERGY SOLUTION, LTD., Seoul (KR)

(72) Inventors: In Young Song, Daejeon (KR); Joo Yul Baek, Daejeon (KR); Jeong Kyu Lee, Daejeon (KR); Sung Joon Oh, Daejeon (KR); Jong Chan Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 225 days.

(21) Appl. No.: 16/996,216

(22) Filed: Aug. 18, 2020

(65) Prior Publication Data

US 2021/0057719 A1 Feb. 25, 2021

(30) Foreign Application Priority Data

Aug. 19, 2019 (KR) .......... 10-2019-0101343
Aug. 5, 2020 (KR) .......... 10-2020-0098150

(51) Int. Cl.
*H01M 4/133* (2010.01)
*H01M 4/36* (2006.01)
(Continued)

(52) U.S. Cl.
CPC .......... *H01M 4/133* (2013.01); *H01M 4/366* (2013.01); *H01M 4/587* (2013.01);
(Continued)

(58) Field of Classification Search
CPC ...... H01M 4/133; H01M 4/366; H01M 4/587; H01M 2004/027
See application file for complete search history.

(56) References Cited

U.S. PATENT DOCUMENTS

2006/0240326 A1   10/2006   Lee et al.
2014/0295248 A1   10/2014   Hotta et al.
(Continued)

FOREIGN PATENT DOCUMENTS

JP       6119857 B2     4/2017
JP    2018-190521 A    11/2018
(Continued)

OTHER PUBLICATIONS

English language equivalent to WO2018062836 orginally published to Lee et al.on Apr. 2018.*

(Continued)

*Primary Examiner* — Jonathan G Jelsma
(74) *Attorney, Agent, or Firm* — Bryan Cave Leighton Paisner LLP (57) ABSTRACT

The present invention relates to an electrode for a secondary battery in which a first electrode material mixture layer including a first negative electrode active material, a first conductive agent, and a first binder is formed on a current collector, and a second electrode material mixture layer including a second negative electrode active material, a second conductive agent, and a second binder is formed on the first electrode material mixture layer, wherein the first negative electrode active material and the second negative electrode active material each include at least one selected from the group consisting of natural graphite and artificial graphite, and when the electrode is analyzed by a shear strength analysis method, a ratio of a maximum value ($\sigma_{max}$) to a minimum value ($\sigma_{min}$) in a simplified shear strength ($\sigma$) profile is 1.7 or less.

12 Claims, 6 Drawing Sheets

(51) Int. Cl.
*H01M 4/587* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2016/0087280 A1 | 3/2016 | Toyama et al. |
| 2016/0163812 A1 | 6/2016 | Ushijima et al. |
| 2018/0083283 A1 | 3/2018 | Yamashita et al. |
| 2019/0305308 A1 | 10/2019 | Lee et al. |

FOREIGN PATENT DOCUMENTS

| | | |
|---|---|---|
| KR | 10-2006-0110635 A | 10/2006 |
| KR | 10-2018-0035693 A | 4/2018 |
| WO | WO2018062836 * | 4/2018 |

OTHER PUBLICATIONS

Westphal et al; Critical electrode properties and drying conditions causing component segregation in graphitic anodes for lithium-ion batteries (Year: 2018).*
Extended European Search Report for European Application No. 20190695.5. dated Jan. 21, 2021.
Son et al., "Measurement and Analysis of Adhesion Property of Lithium-Ion Battery Electrodes with SAICAS," ACS Applied Materials & Interfaces, vol. 6, No. 1, Jan. 8, 2014, pp. 526-531, XP055359994.

* cited by examiner

ELECTRODE FOR SECONDARY BATTERY AND LITHIUM SECONDARY BATTERY COMPRISING THE SAME

FIELD OF THE INVENTION

The present invention relates to an electrode for a secondary battery and a lithium secondary battery including the same.

BACKGROUND ART

Recently, with the rapid spread of electronic devices using batteries, such as mobile phones, notebook computers, and electric vehicles, demand for secondary batteries with relatively high capacity well as as small size and lightweight has been rapidly increased. Particularly, since a lithium secondary battery is lightweight and has high energy density, the lithium secondary battery is in the spotlight as a driving power source for portable devices. Accordingly, research and development efforts for improving performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

With respect to the electrode active material, a conductive agent, and a current collector which constitute the electrode of the lithium secondary battery, bonding forces between the components of the electrode may be increased by a polymer binder, and an exfoliation phenomenon of the electrode may be suppressed during coating, drying, and rolling processes of the electrode. Also, output characteristics may be improved by increasing electrical conductivity through the conductive agent.

However, since an amount of the polymer binder having insulator properties in a limited space of the electrode is minimized to increase capacity of the electrode, a problem of electrode fracture occurs due to a decrease in binding force. Also, the fracture of the electrode may occur due to non-uniformity of the binder in the electrode according to process conditions. Furthermore, respect to with a multilayer electrode in which electrode active materials, which are respectively advantageous in battery life characteristics, capacity, and strength characteristics, are configured in multi-layers, fracture between electrode layers may occur due to differences in adhesion and strengths of the different electrode active materials, and, accordingly, the life characteristics may be degraded. Particularly, with respect to a multilayer electrode in which artificial graphite having excellent life characteristics and capacity characteristics and graphite natural having excellent strength and adhesion are formed in multi-layers, it is advantageous for cost reduction while battery characteristics are improved, but fracture, particularly, interlayer fracture in the electrode may occur due to differences in adhesion and strengths between the artificial graphite and the natural graphite, and, accordingly, the life characteristics may be degraded.

PRIOR ART DOCUMENTS

Patent Documents (Patent Document 1) U.S. Patent Publication No. 2014-0295248

DISCLOSURE OF THE INVENTION

Technical Problem

In a multilayer electrode, an aspect of the present invention provides an electrode for a secondary battery which suppresses fracture, particularly, interlayer fracture in the electrode during operation of the lithium secondary battery and has excellent life characteristics and capacity characteristics while having cost competitiveness.

Technical Solution

According to an aspect of the present invention, there is provided an electrode for a secondary battery in which a first electrode material mixture layer including a first negative electrode active material, a first conductive agent, and a first binder is formed on a current collector, and a second electrode material mixture layer including a second negative electrode active material, a second conductive agent, and a second binder is formed on the first electrode material mixture layer, wherein the first negative electrode active material and the second negative electrode active material each include at least one selected from the group consisting of natural graphite and artificial graphite, and when the electrode is analyzed by a shear strength analysis method, a ratio of a maximum value ($\sigma_{max}$) to a minimum value ($\sigma_{min}$) in a simplified shear strength ($\sigma$) profile is 1.7 or less.

[Shear Strength Analysis Method]

A shear strength ($\sigma$) profile according to an electrode depth is obtained while cutting the electrode from a surface of the electrode material mixture layer until reaching the current collector using a surface and interfacial cutting analysis system (SAICAS), and a finally simplified shear strength ($\sigma$) profile is obtained by simplifying fluctuations in the shear strength ($\sigma$) profile.

According to another aspect of the present invention, there is provided a lithium secondary battery including the electrode for a secondary battery.

Advantageous Effects

An electrode for a secondary battery according to the present invention may suppress fracture, particularly, interlayer fracture in the multilayer electrode during operation of the lithium secondary battery, and may exhibit excellent life characteristics and capacity characteristics while having cost competitiveness. Particularly, with respect to the multilayer electrode in which artificial graphite having excellent life characteristics and capacity characteristics and natural graphite having excellent strength and adhesion are formed in multi-layers, the fracture, particularly, interlayer fracture in the electrode, which occurs due to differences in adhesion and strengths between the artificial graphite and the natural graphite, may be suppressed, and life characteristics may be improved.

PARTICULAR MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

An electrode for a secondary battery of the present invention is an electrode in which a first electrode material mixture layer including a first negative electrode active material, a first conductive agent, and a first binder is formed on a current collector, and a second electrode material mixture layer including a second negative electrode active material, a second conductive agent, and a second binder is formed on the first electrode material mixture layer, wherein the first negative electrode active material and the second negative electrode active material each include at least one selected from the group consisting of natural graphite and artificial graphite, and when the electrode is analyzed by the following shear strength analysis method, a ratio of a maximum value ($\sigma_{max}$) to a minimum value ($\sigma_{min}$) in a simplified shear strength ($\sigma$) profile is 1.7 or less.

[Shear Strength Analysis Method]

A shear strength ($\sigma$) profile according to an electrode depth is obtained while cutting the electrode from a surface of the electrode material mixture layer until reaching the current collector using a surface and interfacial cutting analysis system (SAICAS), and a finally simplified shear strength ($\sigma$) profile is obtained by simplifying fluctuations in the shear strength ($\sigma$) profile.

The electrode for a secondary battery of the present invention may be a negative electrode, and may be a multilayer-structured electrode including the first electrode material mixture layer formed on the current collector and the second electrode material mixture layer formed on the first electrode material mixture layer. The first and second negative electrode active materials, the first and second conductive agents, and the first and second binders, which are included in the first electrode material mixture layer and the second electrode material mixture layer, respectively, may be the same or may be different from each other.

The current collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to a positive electrode collector, microscopic irregularities may be formed on the surface of the collector to improve the adhesion of the negative electrode active material. The current collector, for example, may be used in various shapes such as that of a film, a sheet, a foil, a net, a porous body, a foam body, a non-woven fabric body, and the like.

The first negative electrode active material and the second negative electrode active material each include at least one selected from the group consisting of natural graphite and artificial graphite, and may optionally further include a carbonaceous material such as graphitized carbon fibers and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite.

Preferably, the first negative electrode active material included in the first electrode material mixture layer, as a lower portion of the electrode, may include natural graphite having excellent strength and adhesion, and the second negative electrode active material included in the second electrode material mixture layer, as an upper portion of the electrode, may include artificial graphite having excellent life characteristics and capacity.

Also, the first and second electrode material mixture layers include the first and second binders and the first and second conductive agents together with the first and second negative electrode active materials, respectively.

The first and second conductive agents are used to provide conductivity to the electrode, wherein any conductive agent may be used without particular limitation as long as it has suitable electron conductivity without causing adverse chemical changes in the battery. Specific examples thereof may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the electrode material mixture layer.

The first and second binders improve the adhesion between negative electrode active material particles and the adhesion between the negative electrode active material and the current collector. Specific examples thereof may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the electrode material mixture layer.

The electrode material mixture layer, for example, may be prepared by coating the current collector with a composition for forming an electrode, which includes the negative electrode active material, the binder, and the conductive agent, and drying the coated current collector, or may be prepared by casting the composition for forming an electrode on a separate support and then laminating a film separated from the support on the current collector.

Also, as another method, the electrode may be prepared by casting the composition for forming an electrode material mixture layer on a separate support and then laminating a film separated from the support on the positive electrode collector.

With respect to a multilayer electrode, fracture, particularly, interlayer fracture in the electrode may occur due to differences in adhesion and strengths of different electrode active materials, and, accordingly, life characteristics may be degraded. However, when the multilayer electrode for a secondary battery of the present invention is analyzed by the following shear strength analysis method, since a ratio of a maximum value ($\sigma_{max}$) to a minimum value ($\sigma_{min}$) in a simplified shear strength ($\sigma$) profile satisfies 1.7 or less, the multilayer electrode for a secondary battery of the present invention may suppress fracture, particularly, interlayer fracture in the multilayer electrode during operation of the secondary battery and may exhibit excellent life characteristics and capacity characteristics while having cost competitiveness.

In the shear strength analysis method of the present invention, a shear strength ($\sigma$) profile according to an electrode depth is obtained while cutting the electrode from a surface of the electrode material mixture layer until reaching the current collector using a surface and interfacial cutting analysis system (SAICAS), and a finally simplified shear strength ($\sigma$) profile is obtained by simplifying fluctuations in the shear strength ($\sigma$) profile.

The surface and interfacial cutting analysis system (SAICAS) uses a device for obliquely cutting a coated thin film sample from a surface thereof to an interface using a blade, wherein the shear strength ($\sigma$) profile according to the electrode depth may be obtained from a force applied to the blade.

Figure 1:
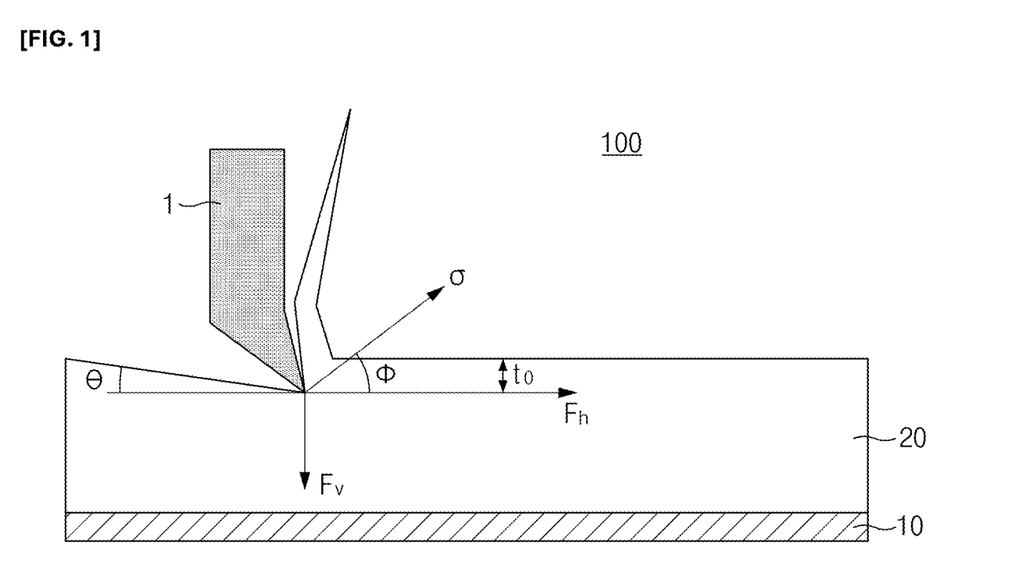
FIG. 1 is a schematic view illustrating a shear plane and shear strength.

FIG. 1 is a schematic view illustrating a shear plane and shear strength during oblique cutting using the surface and interfacial cutting analysis system (SAICAS). Referring to FIG. 1, a blade 1 obliquely cuts an electrode 100 including a current collector 10 and an electrode material mixture layer 20 at a specific cutting angle θ with respect to a surface. In this case, shear strength ($\sigma$) applied to the shear plane may be calculated from a horizontal force $F_h$ and a vertical force $F_v$ which are obtained according to an electrode depth $t_0$.

When using the surface and interfacial cutting analysis system (SAICAS), the cutting angle θ with respect to the shear plane is set to greater than 0° and equal to or less than 10°, and the shear strength ($\sigma$) profile according to the electrode depth may be obtained while cutting the electrode from the surface of the electrode material mixture layer until reaching the current collector. The cutting angle θ may preferably be set to be in a range of 1° to 5.7°, more preferably, 3° to 5.7°. Since the cutting angle θ is set within the above range, measurement time may not only be shortened, but accuracy of shear strength profile data may also be improved.

Also, a running speed of the blade when using the surface and interfacial cutting analysis system (SAICAS) may be set to be in a range of 0.01 μm/s to 10 μm/s in a horizontal direction and 0.001 μm/s to 1 μm/s in a vertical direction. Preferably, the running speed of the blade may be in a range of 0.1 μm/s to 1 μm/s in the horizontal direction and 0.01 μm/s to 0.1 μm/s in the vertical direction, and may be more preferably in a range of 0.1 μm/s to 0.5 μm/s in the horizontal direction and 0.01 μm/s to 0.05 μm/s in the vertical direction. Since resolution of the shear strength profile data is improved by adjusting the running speed of the blade within the above range, a range of minimum value may be narrowly limited.

The blade is not particularly limited as long as it has a hardness higher than the electrode and its shape is not deformed in a cutting process, and, for example, the blade may be diamond, cubic boron nitride (BN), steel, cermet, and ceramic, and may more preferably be cubic boron nitride (BN). The blade, for example, may have a width of 0.1 mm to 4 mm, more preferably, 0.3 mm to 1 mm.

In a step of obtaining the shear strength ($\sigma$) profile according to the electrode depth using the surface and interfacial cutting analysis system (SAICAS), the shear strength ($\sigma$) may be calculated by the following Equation 1.

$$\sigma = \frac{F_h \cos\theta\sin\theta - F_v \sin^2\theta}{bt_0} \qquad [\text{Equation 1}]$$

In Equation 1, $\sigma$ is the shear strength (N/mm$^2$), $F_h$ is the horizontal force (N), $F_v$ is the vertical force (N), θ is the angle (°) with respect to the shear plane, b is the blade width (mm), and $t_0$ is the electrode depth (μm).

Next, a step of simplifying fluctuations in the shear strength ($\sigma$) profile is performed.

The shear strength ($\sigma$) profile previously obtained by Equation 1 using the surface and interfacial cutting analysis system (SAICAS) has fluctuations due to deformation of electrode particles. Thus, in order to clearly and simply select a minimum value ($\sigma_{min}$) and a maximum value ($\sigma_{max}$) in the shear strength ($\sigma$) profile, the shear strength ($\sigma$) profile may be simplified by Equation 2 below.

$$\sigma = A_0 + A_1 d + A_2 d^2 + A_3 d^3 + A_4 d^4 \qquad [\text{Equation 2}]$$

In Equation 2, $\sigma$ is the shear strength (N/mm$^2$), $A_0$, as shear strength when the electrode depth is 0 μm, is a positive number, $A_1$, $A_2$, $A_3$, and $A_4$ are constants obtained by a polynomial fourth-order equation, and d is the electrode depth (μm).

In the electrode for a secondary battery of the present invention, the ratio of the maximum value ($\sigma_{max}$) to the minimum value ($\sigma_{min}$) in the above-obtained simplified shear strength ($\sigma$) profile satisfies 1.7 or less. Preferably, the ratio of the maximum value ($\sigma_{max}$) to the minimum value ($\sigma_{min}$) in the simplified shear strength ($\sigma$) profile may be in a range of 1 to 1.7, and may be more preferably in a range of 1 to 1.5. When the ratio of the maximum value ($\sigma_{max}$) to the minimum value ($\sigma_{min}$) satisfies 1.7 or less, the fracture, particularly, interlayer fracture in the multilayer electrode may be suppressed, and the life characteristics may be improved, and, in a case in which the ratio of the maximum value ($\sigma_{max}$) to the minimum value ($\sigma_{min}$) is greater than 1.7, the life characteristics may be significantly degraded due to internal interlayer fracture of the multilayer electrode. The ratio of the maximum value ($\sigma_{max}$) to the minimum value ($\sigma_{min}$) may be adjusted through uniformization of the shear strength by adjusting the amount of the binder of each electrode material mixture layer and adjusting thickness and density of the electrode material mixture layer.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLE 1

Natural graphite as a first negative electrode active material, carbon black as a first conductive agent, and a carboxylmethyl cellulose (CMC) and a styrene butadiene rubber (SBR), as a first binder, were mixed in a weight ratio of 96.85:0.5:1.15:1.5 in a distilled water solvent to prepare a composition for forming a negative electrode (solid content 40 wt %).

Also, artificial graphite as a second negative electrode active material, carbon black as a second conductive agent, and a carboxylmethyl cellulose (CMC) and a styrene butadiene rubber (SBR), as a second binder, were added at a weight ratio of 95.95:0.5:1.15:2.4 to distilled water and mixed to prepare a composition for forming a second negative electrode (solid content 40 wt %).

One surface of a copper current collector was coated with the composition for forming a first negative electrode and then dried at 100° C., was coated with the composition for forming a second negative electrode and then dried at 100° C., and rolled to prepare a negative electrode which was composed of the current collector, a first negative electrode material mixture layer, and a second negative electrode material mixture layer.

EXAMPLE 2

A negative electrode was prepared in the same manner as in Example 1 except that artificial graphite was used as a first negative electrode active material, the first negative electrode active material, a first conductive agent, and a first binder were mixed a in weight ratio of 95.35:0.5:1.15:3.0 to prepare a composition for forming a first negative electrode, artificial graphite was used as a second negative electrode active material, the second negative electrode active material, a second conductive agent, and a second binder were mixed in a weight ratio of 97.45:0.5:1.15:0.9 to prepare a composition for forming a second negative electrode.

COMPARATIVE EXAMPLE 1

A negative electrode was prepared in the same manner as in Example 2 except that natural graphite was used as a first negative electrode active material.

COMPARATIVE EXAMPLE 2

A negative electrode was prepared in the same manner as in Example 1 except that a weight ratio of the composition for forming a first negative electrode was set at 96.5:0.5:1:2 and a weight ratio of the composition for forming a second negative electrode was set at 97.5:0.5:1.0:1.0.

Experimental Example 1: Shear Strength ($\sigma$) Analysis (1) Shear Strength ($\sigma$) Profile Measurement For each of the negative electrodes of Examples 1 and 2 and Comparative Examples 1 and 2, after a blade was positioned parallel to a surface of the electrode material mixture layer until 0.03 N of vertical force was applied using a surface and interfacial cutting analysis system (SAICAS, SAICAS-DN, Dipla Wintes, Japan), shear strength of the negative electrode in a shear plane direction of the blade was confirmed while the cubic boron nitrate blade was advanced at a horizontal velocity of 0.5 μm/s and a vertical velocity of 0.05 μm/s (cutting angle of 5.7°) in a constant velocity mode. Shear strength ($\sigma$) according to an electrode depth was calculated by Equation 1 below, and the results thereof are illustrated in graphs of FIGS. 2 to 5.

$$\sigma = \frac{F_h\cos\theta\sin\theta - F_v\sin^2\theta}{bt_0} \quad \text{[Equation 1]}$$

In Equation 1, $\sigma$ is the shear strength (N/mm$^2$), $F_h$ is the horizontal force (N), $F_v$ is the vertical force (N), $\theta$ is the angle (°) with respect to the shear plane, b is the blade width (mm), and $t_0$ is the electrode depth (μm).

(2) Shear Strength ($\sigma$) Profile Simplification

The obtained shear strength ($\sigma$) profile was simplified by Equation 2 below, and the results thereof are illustrated in graphs of FIGS. 2 to 5.

$$\sigma = A_0 + A_1 d + A_2 d^2 + A_3 d^3 + A_4 d^4 \quad \text{[Equation 2]}$$

In Equation 2, $\sigma$ is the shear strength (N/mm$^2$), $A_0$, as shear strength when the electrode depth is 0 μm, is a positive number, $A_1$, $A_2$, $A_3$, and $A_4$ are constants obtained by the polynomial fourth-order equation, and d is the electrode depth (μm).

Figure 2:
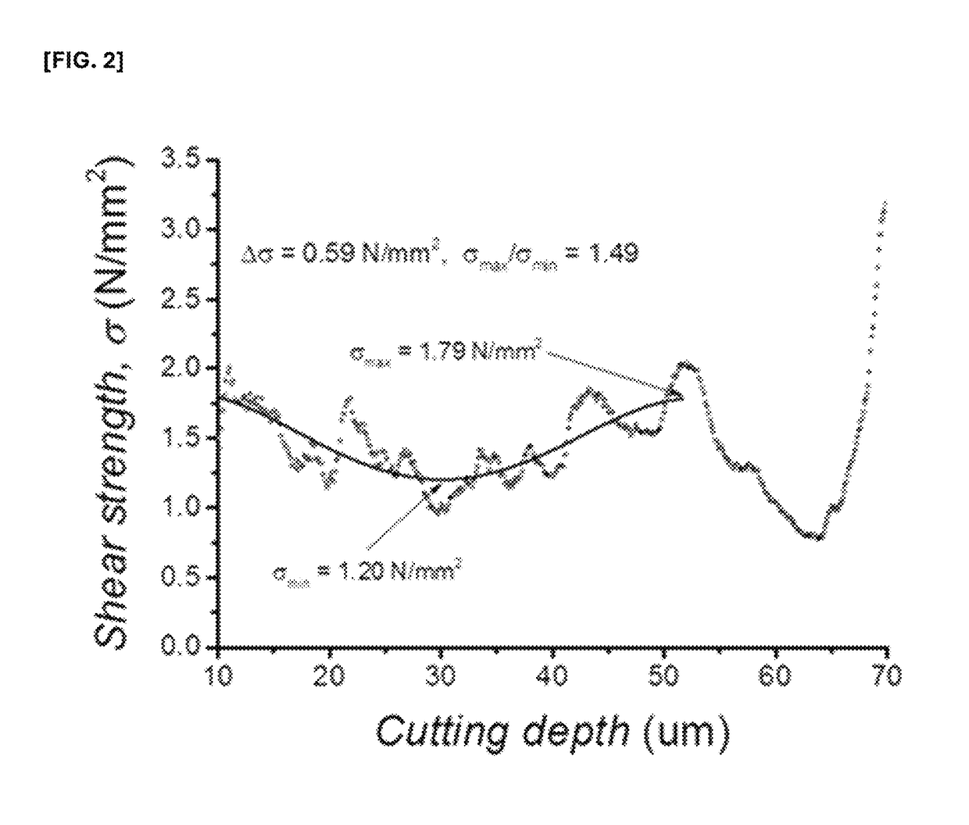
FIG. 2 is a graph illustrating a shear strength profile of an electrode according to Example 1.
Figure 3:
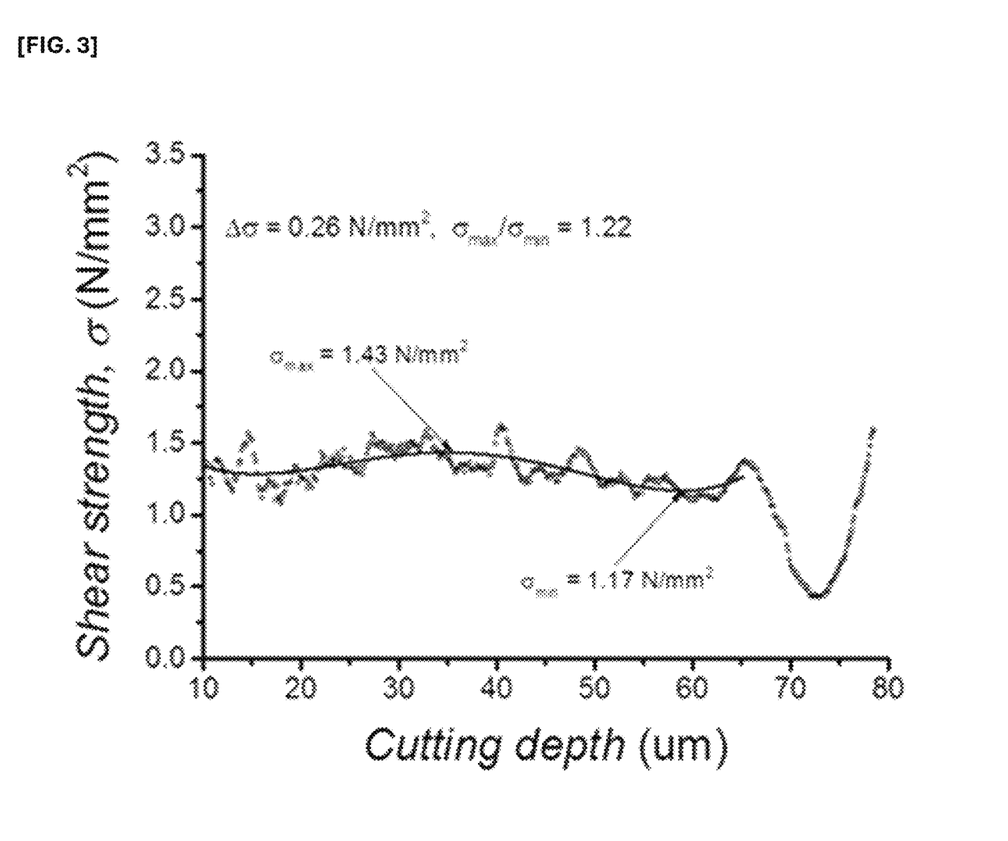
FIG. 3 is a graph illustrating a shear strength profile of an electrode according to Example 2.
Figure 4:
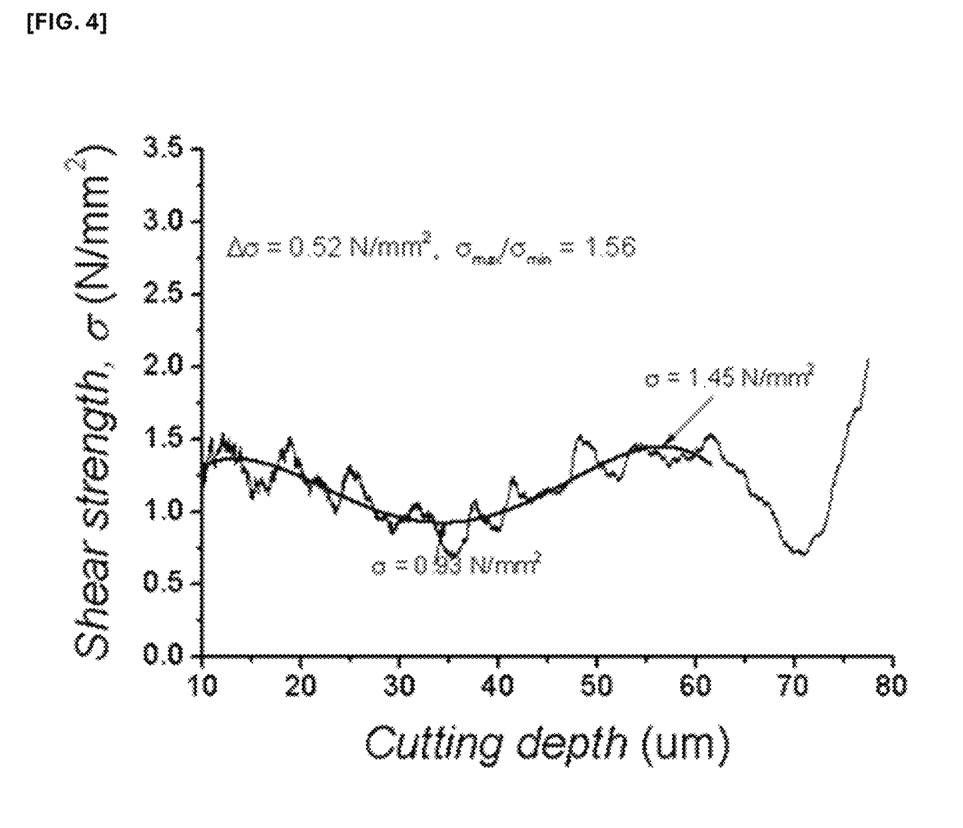
FIG. 4 is a graph illustrating a shear strength profile of an electrode according to Comparative Example 1.
Figure 5:
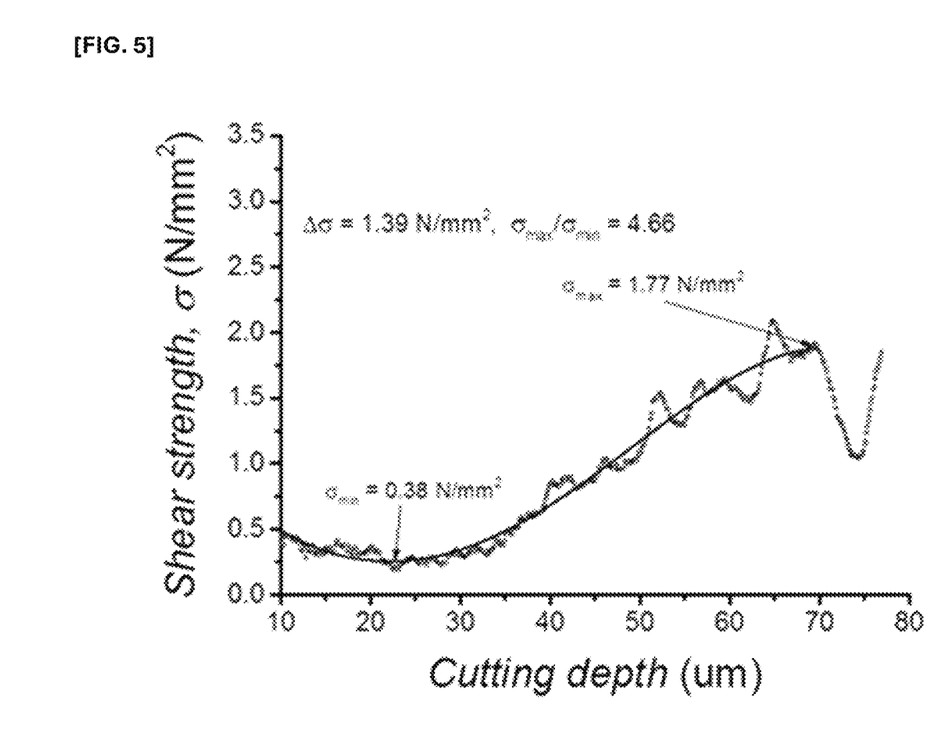
FIG. 5 is a graph illustrating a shear strength profile of an electrode according to Comparative Example 2.

A minimum value ($\sigma_{min}$), a maximum value ($\sigma_{max}$), and a ratio of the maximum value ($\sigma_{max}$) to the minimum value ($\sigma_{min}$) were obtained from each simplified shear strength ($\sigma$) profile illustrated in FIG. 2 (Example 1), FIG. 3 (Example 2), FIG. 4 (Comparative Example 1), and FIG. 5 (Comparative Example 2), and the results thereof are presented in Table 1 below.

TABLE 1

|  | Maximum value ($\sigma_{max}$) (N/mm$^2$) | Minimum value ($\sigma_{min}$) (N/mm$^2$) | $\sigma_{max}/\sigma_{min}$ |
| --- | --- | --- | --- |
| Example 1 | 1.79 | 1.20 | 1.49 |
| Example 2 | 1.43 | 1.17 | 1.22 |
| Comparative Example 1 | 1.77 | 0.38 | 4.66 |
| Comparative Example 2 | 1.55 | 0.33 | 4.70 |

Referring to Table 1, it may be confirmed that, with respect to the negative electrodes of Examples 1 and 2, the ratios of the maximum value ($\sigma_{max}$) to the minimum value ($\sigma_{min}$) satisfied 1.7 or less, but, with respect to the negative electrodes of Comparative Examples 1 and 2, the ratios of the maximum value ($\sigma_{max}$) to the minimum value ($\sigma_{min}$) were greater than 1.7.

Experimental Example 2: Life Characteristics Evaluation

A LiCoO$_2$ positive electrode active material, a carbon black conductive agent, and a PVdF binder were mixed in an N-methylpyrrolidone solvent at a weight ratio of 96:2:2 to prepare a positive electrode material mixture (viscosity: 5000 mPa·s), and one surface of an aluminum current collector was coated with the positive electrode material mixture, dried at 130° C., and then rolled to prepare a positive electrode.

Each of the negative electrodes prepared in Examples 1 and 2 and Comparative Examples 1 and 2 was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/ethylmethyl carbonate/diethyl carbonate (mixing volume ratio of EC/EMC/DEC=3/4/3).

Each of the above-prepared lithium secondary batteries with a battery capacity of 50 mAh was charged at 2.5 V and a constant current of 0.33 C until the voltage became 4.25 V, and was subsequently charged at a constant voltage of 4.25 V, and the charge was terminated when the charge current became 2.5 mA. Thereafter, after being left standing for 30 minutes, each lithium secondary battery was discharged at a constant current of 0.33 C to a voltage of 2.5 V to measure initial capacity. Thereafter, each secondary battery was charged at 2.5 V and a constant current of 1 C at 25° C. until the voltage became 4.25 V, and was subsequently charged at a constant voltage of 4.25 V, and the charge was terminated when the charge current became 2.5 mA. Thereafter, after being left standing for 30 minutes, each secondary battery was discharged at a constant current of 1 C to a voltage of 2.5 V to measure capacity retention when 200 cycles of charge and discharge were performed. The results thereof are illustrated in FIG. 6 and Table 2.

TABLE 2

|  | Capacity retention (%) (@ 200$^{th}$ cycle) |
| --- | --- |
| Example 1 | 96.4 |
| Example 2 | 95.0 |
| Comparative Example 1 | 82.3 |
| Comparative Example 2 | 84.9 |

Figure 6:
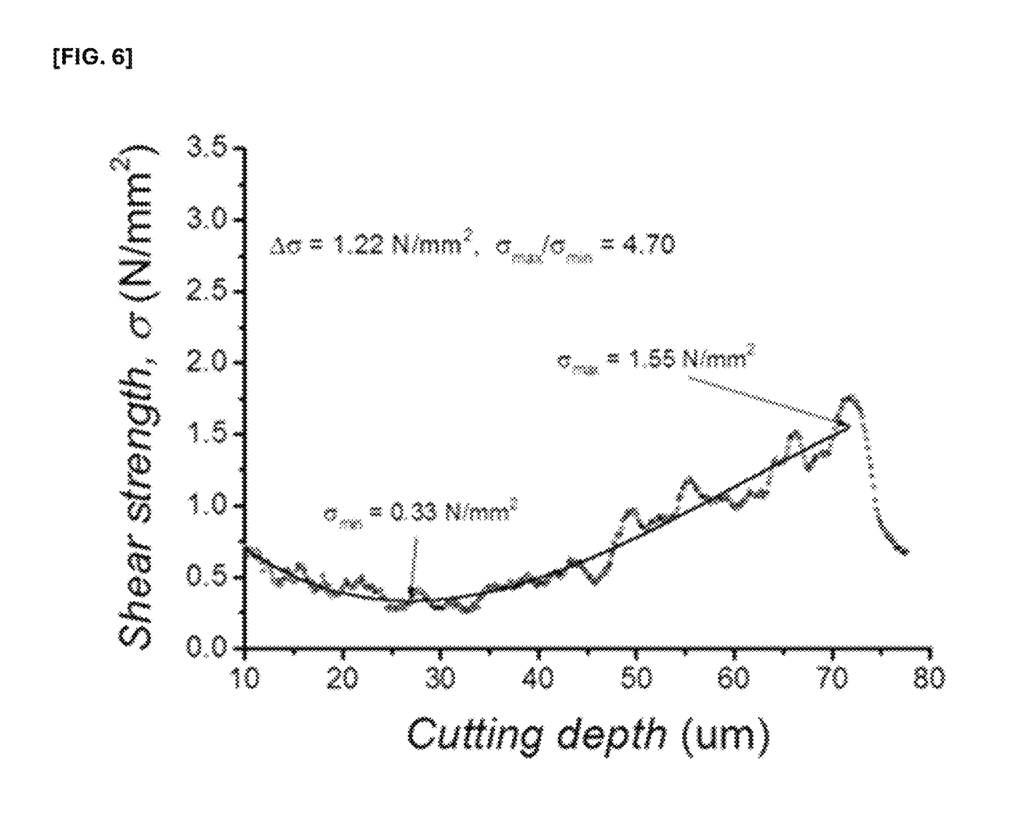
FIG. 6 is a graph illustrating life characteristics of secondary batteries including the electrodes according to the examples and the comparative examples.

Referring to Table 2 and FIG. 6, it may be confirmed that Examples 1 and 2 using the negative electrode, in which the ratio of the maximum value ($\sigma_{max}$) to the minimum value ($\sigma_{min}$) satisfied 1.7 or less, had significantly better life characteristics than Comparative Examples 1 and 2 in which the ratio of the maximum value ($\sigma_{max}$) to the minimum value ($\sigma_{min}$) was greater than 1.7.

What is claimed is:

1. An electrode for a secondary battery, comprising:
   a current collector; and
   at least one electrode material mixture layer present on a surface of the current collector, the at least one electrode material mixture layer comprising a negative electrode active material, a conductive agent, and a binder,
   wherein the electrode has a property such that in a regression curve obtained by regression analysis of shear strength data according to a cutting depth which are measured while obliquely cutting the electrode material mixture layer from a surface thereof until reaching the current collector using a surface and interfacial cutting analysis system (SAICAS), a ratio of a maximum value ($\sigma_{max}$) to a minimum value ($\sigma_{min}$) of shear strength is greater than 1 and equal to or less than 1.7.

2. The electrode for a secondary battery of claim 1, wherein the ratio of the maximum value ($\sigma_{max}$) to the minimum value ($\sigma_{min}$) of the shear strength in the regression curve is in a range of 1 to 1.6.

3. The electrode for a secondary battery of claim 1, wherein the electrode material mixture layer is obliquely cut at a cutting angle of greater than 0° to 10° or less when the surface and interfacial cutting analysis system (SAICAS) is used.

4. The electrode for a secondary battery of claim 1, wherein a running speed of a blade is in a range of 0.01 μm/s to 10 μm/s in a horizontal direction and 0.001 μm/s to 1 μm/s in a vertical direction when the surface and interfacial cutting analysis system (SAICAS) is used.

5. The electrode for a secondary battery of claim 1, wherein the regression curve is obtained by performing a fourth-order polynomial regression analysis on the shear strength data.

6. The electrode for a secondary battery of claim 1, wherein the electrode is a negative electrode.

7. The electrode for a secondary battery of claim 1, wherein the at least one electrode material mixture layer comprises:
   a first electrode material mixture layer on the surface of the current collector and comprising a first negative electrode active material, a first conductive agent, and a first binder; and
   a second electrode material mixture layer on a surface of the first electrode material mixture layer opposite the current collector and comprising a second negative electrode active material, a second conductive agent, and a second binder.

8. The electrode for a secondary battery of claim 7, wherein the first negative electrode active material and the second negative electrode active material are different from each other.

9. The electrode for a secondary battery of claim 7, wherein the first negative electrode active material comprises natural graphite, and the second negative electrode active material comprises artificial graphite.

10. The electrode for a secondary battery of claim 1, wherein the current collector having the first electrode material mixture layer and second first electrode material mixture layer is dried at a temperature ranging from 110° C. to 120° C. for a time period ranging from 30 seconds to 2 minutes.

11. A lithium secondary battery comprising the electrode for a secondary battery of claim 1.

12. An electrode for a secondary battery, comprising:
   a current collector; and
   a first electrode material mixture layer on a surface of the current collector and comprising a first negative electrode active material, a first conductive agent, and a first binder,
   wherein a weight of the first binder in a weight ratio of the first binder to the first negative electrode to the first conductive agent ranges from 2.65 to 4.15; and
   a second electrode material mixture layer on a surface of the first electrode material mixture layer opposite the current collector and comprising a second negative electrode active material, a second conductive agent, and a second binder, wherein a weight of the second binder in a weight ratio of the second binder to the second negative electrode to the second conductive agent ranges from 2.05 to 3.55, wherein, the electrode has a property such that in a regression curve obtained by regression analysis of shear strength data according to a cutting depth which are measured while obliquely cutting the electrode material mixture layer from a surface thereof until reaching the current collector using a surface and interfacial cutting analysis system (SAICAS), a ratio of a maximum value ($\sigma_{max}$) to a minimum value ($\sigma_{min}$) of shear strength is greater than 1 and equal to or less than 1.7.

\* \* \* \* \*